United States Patent Office 3,637,730
Patented Jan. 25, 1972

3,637,730
TETRAHYDROBENZIMIDAZOLES
Berthold Halpern, Menlo Park, Calif., assignor to Syntex Corporation, Panama, Panama
No Drawing. Filed Dec. 1, 1966, Ser. No. 598,190
Claims priority, application Mexico, Dec. 18, 1965, 86,307
Int. Cl. C07d 49/36
U.S. Cl. 260—309                                 8 Claims

ABSTRACT OF THE DISCLOSURE 4,5,6,7 - tetrahydrobenzimidazoles prepared by the reaction of a cyclic 1,3-diketone with an α-amino acid ester hydrohalide followed by treatment with base to obtain an N - (cycloalk - 2 - en - 1 - one - 3 - yl)α-amino acid which is converted into N-(α-isonitrosocycloalkan - 1 - one - 3 - ylidene)α-amino acid by treatment with nitrous acid or nitrosyl chloride which is cyclized to a 4,5,6,7-tetrahydrobenzimidazole having hypotensive activity.

This invention relates to novel tetrahydrobenzimidazoles and to the preparation thereof.

More particularly, the present invention relates to novel 4,5,6,7 - tetrahydrobenzimidazoles of the following formula:

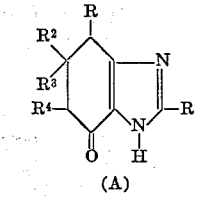

(A)

wherein R represents hydrogen, a lower alkyl group, an aryl group, a monocyclic heterocyclic group, a lower carboalkoxy group, or an amido group of the formula

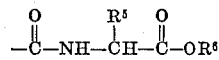

wherein $R^5$ represents hydrogen, a lower alkyl group, an aryl group, a monocyclic heterocyclic group or a lower carboalkoxy group and $R^6$ represents hydrogen, a lower alkyl group or an aryl group and $R^1$, $R^2$, $R^3$ and $R^4$ are each hydrogen, a lower alkyl group or an aryl group provided that at least two of $R^1$, $R^2$, $R^3$ and $R^4$ are hydrogen and when one of $R^1$ and $R^4$ is other than hydrogen, the other is hydrogen.

The novel tetrahydrobenzimidazoles of the present invention also exist in the tautomeric form shown in the following formula:

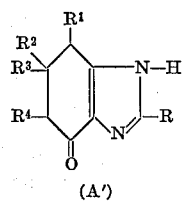

(A′)

wherein R, $R^1$, $R^2$, $R^3$ and $R^4$ are as defined above. Formulas A and A′ represent tautomeric forms of the same compound. For the sake of clarity and to avoid undue prolixity, the novel tetrahydrobenzimidazoles of the present invention will be referred to hereinafter and in the appended claims with reference to Formula A. It is to be understood that reference to the compounds of Formula A is inclusive of the tautomer of Formula A′, and mixtures of A and A′, and not exclusive thereof.

The term "a lower alkyl group," as used herein, refers to an alkyl group or a cycloalkyl group containing less than 8 carbon atoms such as methyl, ethyl, n-propyl, i-propyl, cyclopropyl, n-butyl, s-butyl, i-butyl, t-butyl, cyclopentyl, n-pentyl, i-pentyl, hexyl, heptyl, cycloheptyl, cyclohexyl, i-hexyl, and the like.

The term "an aryl group" as used herein, refers to a substituted or unsubstituted aryl group including aralkyl and alkaryl, preferably containing less than 10 carbon atoms, such as phenyl, benzyl, phenethyl, anisyl, tolyl, and the like, which can be substituted with one or more substituents, e.g., chloro, bromo, fluoro, nitro, a disubstituted amino group, especially dialkylamino and diarylamino, such as dimethylamino, bis(2-chloroethyl) amino or diphenylamino, a cyano group, a free or functionally converted hydroxyl group including esters such as acetoxy, propionoxy or benzoyloxy and ethers such as methoxy, ethoxy, phenoxy, an acyl group such as acetyl, propionyl, or benzoyl, a mono- or di-subtituted amido group such as methylacetamido or dimethylactamido, a substituted mercapto group, especially a lower alkyl mercapto group such as methylmercapto, ethylmercapto or an aryl mercapto group such as benzylmercapto, and the like.

The expression "a monocyclic heterocyclic group," as used herein, refers to a monocyclic heterocyclic group, preferably containing less than 9 carbon atoms, such as pyridyl, pyrrolidyl, pyrryl, pyranyl, furanyl, piperidyl, thienyl, oxypyridyl, pyrimidyl, and the like.

The expression "a lower carboalkoxy group," as used herein, refers to a carboalkoxy group containing less than 8 carbon atoms such as carbomethoxy, carboethoxy, carbobutoxy, and the like.

The novel benzimidazoles of the present invention of Formula A hereinabove wherein the substituent at position 2 is other than an amido group can be prepared by the following illustrated process:

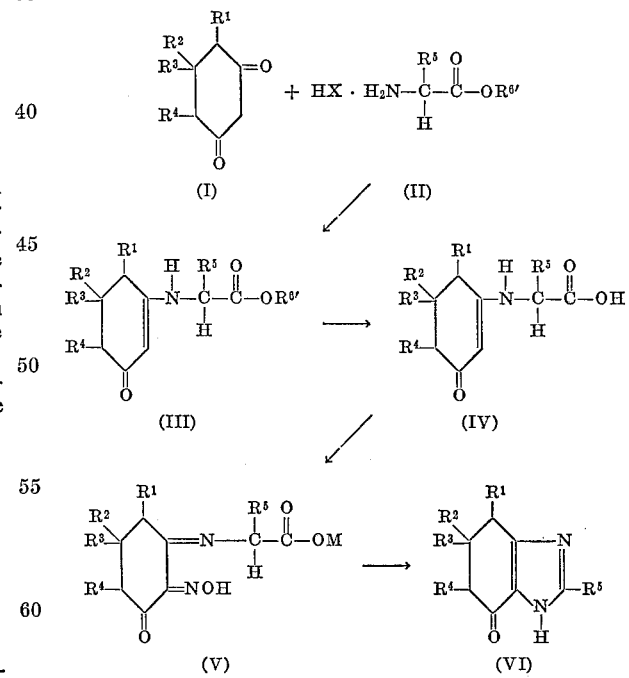

In the above formulas, $R^1$, $R^2$, $R^3$, $R^4$ and $R^5$ are as defined hereinabove, X represents a halogen having an atomic number greater than 9, preferably chlorine or bromine, M represents hydrogen or an alkali metal, preferably sodium or potassium, and $R^{6'}$ represents a lower alkyl group preferably methyl or ethyl, or an aryl group, preferably benzyl.

In practicing the above illustrated process, a cyclic 1,3-diketone I is condensed with an α-amino acid ester hydrohalide II in an inert organic solvent using at least about one molar equivalent, and preferably from about 1 to about 1.1 molar equivalents of the diketone I per mole of the α-amino acid ester hydrohalide II in the presence of an amount of a base sufficient to convert the hydrohalide salt of the amino group to a free amino group, e.g. about one molar equivalent of the base per mole of said α-amino acid ester hydrohalide. This reaction is generally carried out at a temperature of from about 0° C. to about 30° C., and preferably at room temperature (about 25° C.), for periods of time ranging from about 6 hours to about 48 hours or longer. Inert organic solvents which can be used in this reaction include, for example, a halogenated hydrocarbon such as methylene dichloride, chloroform, carbon tetrachloride or chlorobenzene, a lower alcohol such as methanol, or ethanol, an aromatic hydrocarbon such as benzene, toluene or xylene, an ether, and preferably a cyclic ether such as dioxane or tetrahydrofuran, or the like, as well as mixtures thereof. Included among the bases which can be used in carrying out this reaction are alkali metal and alkaline earth metal hydroxides such as lithium hydroxide, sodium hydroxide, potassium hydroxide, calcium hydroxide or magnesium hydroxide, alkali metal and alkaline earth metal oxides such as sodium oxide, potassium oxide or calcium oxide, basic salts of alkali metals and alkaline earth metals such as potassium carbonate, sodium carbonate, sodium bicarbonate or calcium carbonate, alkali metal alkoxides such as potassium methoxide, sodium methoxide, sodium ethoxide or potassium t-butoxide, lower alkyl (including cycloalkyl) and aryl tertiary amines such as trimethylamine, triethylamine, piperidine, pyridine or collidine, and the like.

In the next step of this process, the thus-obtained N-(cycloalk-2-en-1-one-3-yl) α-amino acid ester III is converted into the corresponding N-(cycloalk-2-en-1-one-3-yl) α-amino acid IV. This conversion can be accomplished by basic hydrolysis by contacting the ester III with, for example, an aqueous 5 N sodium hydroxide solution at room temperature for several hours or by refluxing with an aqueous saturated sodium bicarbonate solution for from about 1 to about 6 hours to obtain the free acid IV. When the ester III is a benzyl ester, this conversion can be accomplished by selective hydrogenolysis. The hydrogenolysis can be carried out by first dissolving the N-(cycloalk-2-en-1-one-3-yl) α-amino acid benzyl ester III in water, or in a water-miscible inert polar organic solvent, e.g., a lower alcohol such as methanol, ethanol, propanol or isopropanol, an ether such as dioxane or tetrahydrofuran, a lower aliphatic hydrocarbon monocarboxylic acid such as acetic acid or propionic acid, a hydrocarbon sulfoxide such as dimethyl sulfoxide, a dialkylamido compound such as dimethylformamide or dimethylacetamide, or the like, or in a mixture of two or more of such organic solvents or of water and one or more of such organic solvents. The resulting solution is then hydrogenated, at room temperature and atmospheric pressure, in the presence of a hydrogenation catalyst, e.g. an element of Group VIII of the Periodic Table, and especially nickel, palladium or platinum in any of their catalytic forms such as 5–20% palladium on charcoal, 5–20% platinum on calcium carbonate or finely divided palladium black, platinum black, or Raney nickel, until approximately 1 mole of hydrogen per mole of N-(cycloalk-2-en-1-one-3-yl) α-amino acid benzyl ester has been taken up. When the solvent employed is not acidic, the hydrogenolysis reaction can be accelerated by the addition of a catalytic amount, e.g. a few drops of acid such as hydrochloric acid, sulfuric acid, acetic acid, trichloroacetic acid, or the like.

The thus-obtained N-(cycloalk-2-en-1-one-3-yl) α-amino acid IV is then converted into the corresponding N-(α-isonitrosocycloalkan-1-one-3-ylidene) α-amino acid (V, M is hydrogen) or an alkali metal salt thereof (V, M is an alkali metal). This reaction can be accomplished by treatment with either nitrous acid or nitrosyl chloride. By the first mentioned method, i.e. nitrous acid, the N-cycloalk-2-en-1-one-3-yl) α-amino acid is dissolved in water or in a neutral or acidic water-miscible inert organic solvent, e.g. a lower alcohol, ether, aliphatic hydrocarbon monocarboxylic acid or hydrocarbon sulfoxide of the type mentioned hereinabove, or in a mixture of two or more of such organic solvents or of water and one or more of such organic solvents. This solution is then treated, in the absence of light, with about 1 molar equivalent of nitrous acid or an alkali metal nitrite such as sodium nitrite or potassium nitrite, at a temperature of from about −50° C. to about room temperature and preferably at about 0° C., for from about 10 minutes to about 2 hours or longer, thus giving the corresponding N-(2-isonitrosocycloalkan-1-one-3-ylidene) α-amino acid or an alkali metal salt thereof.

When nitrous acid itself is used, or when either nitrous acid or an alkali metal nitrite is used in an acidic medium, the product will be the free α-amino acid derivative, while if an alkali metal nitrite is used in a neutral medium, the product will be the alkali metal salt corresponding to the alkali metal nitrite used, in this latter case, the reaction medium can then be acidified, if desired, to give the corresponding free α-amino acid derivative.

In certain cases, the free α-amino acid derivative, e.g. N-(5,5-dimethyl-2-isonitrosocyclohexan-1-one-3-ylidene)valine will precipitate from an acidic medium, generally as a purple crystalline product. In all cases, however, the N-(2-isonitrosocycloalkan-1-one-3-ylidene) α-amino acid or an alkali metal salt thereof can be recovered by simply freeze drying the reacted mixture in known manner.

In the second method, i.e. the reaction of nitrosyl chloride with a N-(cycloalk-2-en-1-one-3-yl) α-amino acid IV to obtain the 2-isonitroso compound V, the compound IV is dissolved in suitable organic solvent such as pyridine, collidine, and the like, preferably a basic solvent, or neutral solvent such as dimethylacetamide or dimethylformamide, preferably under anhydrous conditions, and then there is introduced about 1 molar equivalent or more of nitrosyl chloride. In conducting this reaction, a stream of nitrosyl chloride is introduced into the solution at a temperature of between approximately −20° C. and room temperature and at a pressure of about atmospheric pressure. Since the nitrosyl chloride is in gaseous form under these conditions, the reaction time will be such that at least about one molar equivalent of nitrosyl chloride is introduced into the reaction medium. The reaction time generally ranges from about 3 minutes to about one hour.

The thus-obtained 2-isonitroso compound V is then converted into the novel substituted 1,3-imidazole VI. This conversion can be accomplished by first dissolving the isonitroso compound in an inert organic solvent, e.g. a lower alcohol or an aromatic hydrocarbon of the type mentioned hereinabove. Next, if the isonitroso compound is in the form of an alkali metal salt (V, M=alkali metal) approximately one molar equivalent, per molar equivalent of said isonitroso compound, of a strong acid, e.g. p-toluenesulfonic acid, benzenesulfonic acid, hydrochloric acid, perchloric acid, or the like, is added to convert said isonitroso compound to the free acid form. Then the solution is heated to a temperature of at least about 40° C., i.e. from about 40° C. to about 130° C., preferably from about 70° C. to about 100° C., until a definite color change takes place. This will generally take place within from about 15 minutes to about 3 hours and indicates that the reaction has gone to completion, i.e. that the N-(2-isonitrosocycloalkan-1-one-3-ylidene) α-amino acid V has been converted into the novel substituted 1,3-imidazole VI.

The novel benzimidazoles of the present invention of Formula A hereinabove wherein the substituent R at position -2 is an amido group can be prepared by the following illustrated process.

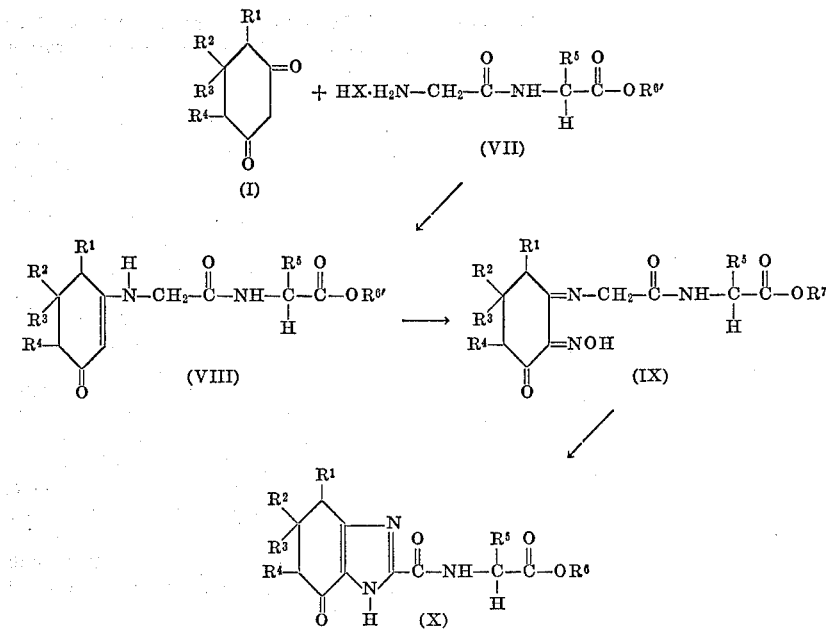

In the above formulas, $R^1$, $R^2$, $R^3$, $R^4$, $R^5$, $R^{6'}$, $R^6$ and X are as defined hereinabove and $R^7$ represents hydrogen, a lower alkyl group or an aryl group or an alkali metal.

The above outlined process is practiced very similar to the process first described hereinabove for the preparation of the novel imidazoles of Formula VI. The first step involves condensing a cyclic 1,3-diketone I with a peptide ester hydrohalide VII to produce the N-(cyclohex-2-en-1-one-3-yl) peptide ester VIII. This condensation step can be carried out in the same manner as described hereinabove for the condensation of the cyclic 1,3-diketone I and α-amino acid ester hydrohalide II. Alternatively, the N-(cyclohex-2-en-1-one-3-yl)peptide ester VIII can be prepared by condensing a N-(cyclohex-2-en-1-one-3-yl) α-amino acid IV (IV, $R^5$=hydrogen) with an α-amino acid ester hydrohalide II under any of the standard reaction conditions used in coupling amino acids to form peptides, e.g. using N,N'-dicyclohexylcarbodiimide or the like in the manner described in Halpern et al., Austral. J. Chem., vol. 18, No. 3, (March 1965), pp. 417–421.

Next, the N-(cyclohex-2-en-1-one-3-yl) peptide ester VIII is reacted with nitrous acid or nitrosyl chloride in the manner described hereinabove to give the isonitroso compound IX. Alternatively, the N-(cyclohex-2-en-1-one-3-yl) peptide ester VIII can be deesterified in the manner described hereinabove to give the corresponding N-(cyclohex-2-en-1-one-3-yl) peptide having a free terminal carboxyl group before preparing the isonitroso compound IX in which case $R^7$ can be hydrogen.

The thus-obtained isonitroso compound IX is then dissolved in an inert organic solvent and heated to furnish the novel substituted 1,3-imidazoles X. This reaction is conducted according to the procedure described hereinabove for the conversion of the isonitroso compound V to the novel imidazole VI.

An illustrative but by no means exhaustive listing of cyclic-1,3-diketones (I) which can be employed in preparing the novel compounds of the present invention according to the above described processes is the following:

1,3-cyclohexanedione,
4-methyl-1,3-cyclohexanedione,
5-methyl-1,3-cyclohexanedione,
4-ethyl-1,3-cyclohexanedione,
4-propyl-1,3-cyclohexanedione,
5-propyl-1,3-cyclohexanedione,
4-isopropyl-1,3-cyclohexanedione,
5-isopropyl-1,3-cyclohexanedione,
5-amyl-1,3-cyclohexanedione,
5-(1-ethylpropyl)-1,3-cyclohexanedione,
4-hexyl-1,3-cyclohexanedione,
4-cyclohexyl-1,3-cyclohexanedione,
5-cyclohexyl-1,3-cyclohexanedione,
4-phenyl-1,3-cyclohexanedione,
5-phenyl-1,3-cyclohexanedione,
4-benzyl-1,3-cyclohexanedione,
5-benzyl-1,3-cyclohexanedione,
5-phenethyl-1,3-cyclohexanedione,
5-(p-hydroxyphenyl)-1,3-cyclohexanedione,
4-(p-methoxyphenyl)-1,3-cyclohexanedione,
5-(p-methoxyphenyl)-1,3-cyclohexanedione,
5-(o-anisyl)-1,3-cyclohexanedione,
5-(o-chlorophenyl)-1,3-cyclohexanedione,
5,5-dimethyl-1,3-cyclohexanedione,
5,5-diethyl-1,3-cyclohexanedione,
5-ethyl-5-methyl-1,3-cyclohexanedione,
5-isohexyl-5-methyl-1,3-cyclohexanedione,
4,5-diphenyl-1,3-cyclohexanedione, and the like.

Typical of the α-amino acid ester hydrohalides (II) which can be condensed with the 1,3-cyclohexanediones (I) are the hydrohalides, preferably the hydrochloride or hydrobromide of esters, preferably the benzyl ester, of the following:

glycine,
alanine,
2-ethylglycine,
valine,
isoleucine,
leucine,
2-pentylglycine,
2-hexylglycine,
2-heptyglycine,
2-cyclopropylglycine,
2-methylcyclopropylglycine,
2-cyclobutylglycine,
2-cyclopentylglycine,
2-cyclohexylglycine,
2-phenylglycine,
phenylalanine,
tyrosine, 2-(2-phenethyl) glycine,
2-(p-tolyl)glycine,
2-(p-chlorophenyl)glycine,
2-(o-chlorophenyl)glycine,
2-(p-nitrophenyl)glycine,
2-(m-chlorophenyl)glycine,
norvaline,
norleucine,
2-(m-nitrophenyl)glycine,
2-(m-cyanophenyl)glycine,
2-(o-hydroxyphenyl)glycine,
2-(m-hydroxyphenyl)glycine,
2-(p-hydroxyphenyl)glycine,
2-(3-hydroxy-p-tolyl)glycine,
2-(p-methoxyphenyl)glycine,
2-(m[bis(2-chloroethyl)amino]phenyl)glycine,
2-(p[bis(2-chloroethyl)amino]phenyl)glycine,
2-(5-acetamido-o-tolyl)glycine,
2-carboxyphenylglycine,
2-(3-carboxy-4-hydroxyphenyl)glycine,
2-benzoylglycine,
2-piperidylglycine,
2-pyridylglycine,
2-thienylglycine,
2-furylglycine,
2-(2,4-dichlorophenyl)glycine,
2-(3,4-dichlorophenyl)glycine,
2-(4-hydroxy-3-methoxyphenyl)glycine,
and the like.

Typical of the peptide ester hydrohalides VII which are used to prepare the novel compounds of the present invention of Formula X are the hydrohalides, preferably the hydrochloride or hydrobromide, of the esters, preferably the benzyl ester, of the following: glycyl glycine, glycyl alanine, glycyl valine, glycyl phenylalanine, glycyl tyrosine, glycyl leucine, glycyl isoleucine, and the like, including D- and L- forms and mixtures thereof.

While the present invention has been described hereinabove with particular reference to preparation of the novel 4,5,6,7-tetrahydrobenzimidazoles of Formula A above, it is also applicable to the preparation of substituted 1,3-imidazoles of the following partial formula:

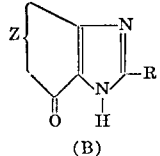

(B)

wherein R is the same as defined hereinabove and Z represents a moiety having the partial structural formula

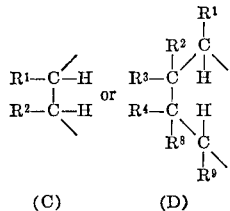

(C)          (D)

wherein each of $R^1$, $R^2$, $R^3$, $R^4$, $R^8$ and $R^9$ is selected from the group consisting of hydrogen, a lower alkyl group or an aryl group, provided that in a compound of Formula B containing moiety C at least one of $R^1$ and $R^2$ is hydrogen and further provided that in a compound of Formula B containing moiety D at least three of $R^1$, $R^2$, $R^3$, $R^4$, $R^8$ and $R^9$ are hydrogen and when one of $R^1$ and $R^9$ is other than hydrogen, the other is hydrogen.

The symbol Z can also represent a substituted of unsubstituted orthophenylene group

or orthobenzylene group

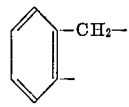

The compounds of Formula B can be prepared according to the procedure described herein for the preparation of the 4,5,6,7-tetrahydrobenzimidazoles using in lieu of the substituted or unsubstituted 1,3-cyclohexanedione (I) the appropriate cyclic 1,3-diketone, e.g. 1,3-cyclopentanedione, 4-propyl-1,3-cyclopentanedione, 1,3-cycloheptanedione, 4-phenyl - 1,3 - cycloheptanedione, 1,3-indandione, and the like.

The novel compounds of the present invention are valuable therapeutic agents possessing hypotensive and antiinflammatory activity. They are useful for reducing blood pressure in hypertensive and normotensive cases. In addition, they possess a sedative action. They are useful for the treatment of hypertension in animals, e.g. horses, cattle, dogs, or cats brought about by old age or shipping, showing, or other stress conditions. They can be administered orally or by injection together with one or more pharmaceutically acceptable excipients at a dosage level of from about 20 mg. to about 80 mg. per kilogram of body weight per day. However, dosages below or above the foregoing range can also be used depending on such factors as the degree and severity of the condition, response to initial treatment and the like. The compounds of the present invention can be administered topically for treatment of inflammatory conditions.

The following examples are provided to illustrate the present invention and not as a limitation thereof.

EXAMPLE I

One gram of glycine benzyl ester hydrobromide (benzyl aminoacetate hydrobromide) was added to a solution of one molar equivalent of dimedone (5,5-dimethylcyclohexane-1,3-dione) in 20 cc. of chloroform, and the resulting suspension was neutralized by the addition of one molar equivalent of anhydrous triethylamine, thus giving a clear solution. This solution was allowed to stand at room temperature overnight, then evaporated to dryness. The residue was triturated with hot benzene, filtered, and then chromatographed on alumina, using benzene as the eluant. This gave a yellowish oil which was then crystallized from benzene to give N-(5,5-dimethyl-cyclohex-2-en-1-one-3-yl) glycine benzyl ester [dimedonyl glycine or benzyl N - (5,5-dimethylcyclohex-2-en-1-one-3-yl)aminoacetate].

This procedure was then repeated in every detail except for the following. Glycine benzyl ester hydrobromide was replaced by the aminoacid ester hydrohalides listed in column I hereinbelow, which were condensed with the cyclic 1,3-diketones listed in column II hereinbelow. In each case, the N-(cyclohex-2-en-1-one-3-yl) α-amino acid ester listed in column III hereinbelow was obtained.

| I | II | III |
|---|---|---|
| Glycine ethyl ester hydrobromide. | Dimedone. | N-(5,5-dimethylcyclohex-2-en-1-one-3-yl) glycine ethyl ester. |
| Glycine benzyl ester hydrobromide. | 5,5-diethyl-1,3-cyclohexanedione. | N-(5,5-diethylcyclohex-2-en-1-one-3-yl) glycine benzyl ester. |
| DL-alanine benzyl ester hydrobromide. | 1,3-cyclohexanedione. | N-(cyclohex-2-en-1-one-3-yl) DL-alanine benzyl ester. |
| Do. | Dimedone. | N-(5,5-dimethylcyclohex-2-en-1-one-3-yl) DL-alanine benzyl ester. |
| Do. | 4,5-diphenyl-1,3-cyclohexanedione. | N-(4,5-diphenylcyclohex-2-en-1-one-3-yl) DL-alanine benzyl ester. |
| D-alanine benzyl ester hydrochloride. | Dimedone. | N-(5,5-dimethylcyclohex-2-en-1-one-3-yl) D-alanine benzyl ester. |
| L-alanine benzyl ester hydrochloride. | do. | N-(5,5-dimethylcyclohex-2-en-1-one-3-yl) L-alanine benzyl ester. |
| 2-ethylglycine benzyl ester hydrobromide. | 5-isopropyl-1,3-cyclohexanedione. | N-(5-isopropylcyclohex-2-en-1-one-3-yl)-2-ethylglycine benzyl ester. |

TABLE—Continued

| I | II | III |
|---|---|---|
| DL-valine benzyl ester hydrobromide. | Dimedone | N-(5,5-dimethylcyohexl-2-en-1-one-3-yl) DL-valine benzyl ester. |
| Do | 4,5-diphenyl-1,3-cyclohexanedione. | N-(4,5-diphenylcyclohex-2-en-1-one-3-yl) DL-valine benzyl ester. |
| Do | 4-cyclohexyl-1,3-cyclohexanedione. | N-(4-cyclohexylcyclohex-2-en-1-one-3-yl) DL-valine benzyl ester. |
| DL-valine nitrophenyl ester hydrobromide. | Dimedone | N-(5,5-dimethylcyclohex-2-en-1-one-3-yl) DL-valine nitrophenyl ester. |
| D-valine methyl ester hydrochloride. | do | N-(5,5-dimethylcyclohex-2-en-1-one-3-yl) D-valine methyl ester. |
| L-valine benzyl ester hydrobromide. | do | N-(5,5-dimethylcyclohex-2-en-1-one-3-yl) L-valine benzyl ester. |
| DL-norvaline methyl ester hydrochloride. | 4-amyl-1,3-cyclohexanedione. | N-(4-amylcyclohex-2-en-1-one-3-yl) DL-norvaline methyl ester. |
| D-norvaline ethyl ester hydrochloride. | 5-cyclohexyl-1,3-cyclohexanedione. | N-(5-cyclohexylcyclohexan-2-en-1-one-3-yl) D-norvaline ethyl ester. |
| L-leucine methyl ester hydrochloride. | Dimedone | N-(5,5-dimethylcyclohex-2-en-1-one-3-yl) L-leucine methyl ester. |
| D-leucine methyl ester hydrochloride. | do | N-(5,5-dimethylcyclohex-2-en-1-one-3-yl) D-leucine methyl ester. |
| DL-norleucine benzyl ester hydrobromide. | do | N-(5,5-dimethylcyclohex-2-en-1-one-3-yl) DL-norleucine benzyl ester. |
| DL-isoleucine benzyl ester hydrobromide. | do | N-(5,5-dimethylcyclohex-2-en-1-one-3-yl) DL-isoleucine benzyl ester. |
| 2-cyclohexylglycine glycine methyl ester hydrobromide. | 1,3-cyclohexanedione. | N-(cyclohex-2-en-1-one-3-yl) 2-cyclohexylglycine methyl ester. |
| 2-(p-chlorophenyl) glycine ethyl ester hydrochloride. | 4-phenyl-1,3-cyclohexanedione. | N-(4-phenylcyclohex-2-en-1-one-3-yl) 2-(p-chlorophenyl) glycine ethyl ester. |
| 2-(p-nitrophenyl) glycine benzyl ester hydrochloride. | 4-benzyl-1,3-cyclohexanedione. | N-(4-benzylcyclohex-2-en-1-one-3-yl) 2-(p-nitrophenyl) glycine benzyl ester. |
| DL-phenylalanine hydrochloride. | Dimedone | N-(5,5-dimethylcyclohex-2-en-1-one-3-yl) DL-phenylalanine ethyl ester. |
| DL-phenylalanine benzyl ester hydrobromide. | do | N-(5,5-dimethylcyclohex-2-en-1-one-3-yl) DL-phenylalanine benzyl ester. |
| DL-phenylalanine benzyl ester hydrobromide. | 5-phenyl-1,3-cyclohexanedione. | N-(5-phenylcyclohex-2-en-1-one-3-yl) DL-phenylalanine benzyl ester. |
| L-phenylalanine methyl ester hydrochloride. | Dimedone | N-(5,5-dimethylcyclohex-2-en-1-one-3-yl) L-phenylalanine methyl ester. |
| D-tyrosine benzyl ester hydrochloride. | do | N-(5,5-dimethylcyclohex-2-en-1-one-3-yl) D-tyrosine benzyl ester. |
| L-tyrosine benzyl ester hydrochloride. | 1,3-cyclohexanedione. | N-(cyclohex-2-en-1-one-3-yl) L-tyrosine benzyl ester. |

EXAMPLE II

A suspension of 0.5 gram of 5% palladium-on-charcoal hydrogenation catalyst in 50 cc. of methanol was hydrogenated for 30 minutes at room temperature and atmospheric pressure. Next, a solution of 2 grams of N-(5,5 - dimethylcyclohex-2-en-1-one-3-yl) glycine benzyl ester in 200 cc. of methanol was added to the suspension, and the resulting reaction mixture was hydrogenated at room temperature and atmospheric pressure, with stirring, until one molar equivalent of hydrogen had been absorbed. At this point, the reaction was stopped by filtering off the catalyst, and the resulting filtrate was then evaporated to dryness. Recrystallization of the resulting residue from water gave N-(5,5-dimethylcyclohex-2-en-1-one-3-yl) glycine.

By repeating this procedure in every detail but one, namely, replacing N-(5,5-dimethylcyclohex-2-ene-1-one-3-yl) glycine benzyl ester with the remaining N-(cyclohex-2-en-1-one-3-yl) α-amino acid benzyl esters listed in column III hereinabove, the corresponding free N-cyclohex-2-en-1-one-3-yl) α-amino acids were obtained.

EXAMPLE III

A solution of 0.3 gram of N-(5,5-dimethylcyclohex-2-en-1-one-3-yl) glycine ethyl ester in 5 ml. of an aqueous 5 N sodium hydroxide solution was allowed to stand at room temperature overnight. Following this reaction period the solution was acidified to pH 4 with dilute aqueous hydrochloric acid, then passed through a column of Dowex 50 W (sulfonated polystyrene beads) ion-exchange resin in the acid form and eluted with 5% pyridine. Evaporation of the resulting eluate followed by recrystallization from water gave N-(5,5-dimethylcyclohex-2-en-1-one-3-yl) glycine.

By repeating this procedure in every detail but one, namely, replacing N-(5,5-dimethylcyclohex-2-en-1-one-3-yl) glycine ethyl ester with:

N-(5,5-dimethylcyclohex-2-en-1-one-3-yl) DL-valine nitrophenyl ester,

N-(5,5-dimethylcyclohex-2-en-1-one-3-yl) D-valine methyl ester,

N-(4-amylcyclohex-2-en-1-one-3-yl) DL-norvaline methyl ester,

N-(5-cyclohexylcyclohex-2-en-1-one-3-yl) D-norvaline ethyl ester,

N-(5,5-dimethylcyclohex-2-en-1-one-3-yl) L-leucine methyl ester,

N-(5,5-dimethylcyclohex-2-en-1-one-3-yl) D-leucine methyl ester,

N-(cyclopent-2-en-1-one-3-yl) 2-pentylglycine methyl ester,

N-(cyclohex-2-en-1-one-3-yl) 2-cyclohexylglycine methyl ester,

N-(4-phenylcyclohex-2-en-1-one-3-yl) 2-(p-chlorophenyl) glycine ethyl ester,

N-(5,5-dimethylcyclohex-2-en-1-one-3-yl) DL-phenylalanine ethyl ester, and

N-(5,5-dimethylcyclohex-2-en-1-one-3-yl) L-phenylalanine methyl ester, respectively, the corresponding free N-(cyclohex-2-en-1-one-3-yl) α-amino acids were obtained.

EXAMPLE IV

A suspension of 150 mg. [0.71 mmol (millimol)] of N-(5,5 - dimethylcyclohex - 2-en-1-one-3-yl) glycine in 1 ml. of water was cooled to 0° C., with stirring. Next, 0.49 gram (0.71 mmol) of sodium nitrite was added to the stirred suspension, and stirring was continued at 0° C. until a homogeneous, purple-red solution was obtained. This solution was then freeze-dried to give N-(2-isonitroso-5,5 - dimethylcyclohexan-1-one-ylidene) glycine sodium salt.

By repeating this procedure in every detail but one, namely, replacing N-(5,5-dimethylcyclohex-2-en-1-one-3-yl) glycine with the remaining free N-(cyclohex-2-en-1-one-3-yl) α-amino acids prepared as described in Examples II and III hereinabove, the corresponding N-(2-isonitrosocyclohexan - 1 - one - 3-ylidene) α-amino acid sodium salts, namely, N-(2-isonitroso-5,5-dimethylcyclohexane-1-one-3 ylidene) glycine sodium salt, N-(2-isonitroso-5,5-diethylcyclohexan-1-one-3-ylidene) glycine sodium salt, N-(2-isonitrosocyclohexan-1-one-3-ylidene) DL-alanine sodium salt, N-(2-isonitroso-5,5-dimethylcyclohexan-1-one-3-ylidene)-DL-alanine sodium salt, N-(2-isonitroso-4,5-diphenylcyclohexan-1-one-3-ylidene-DL-alanine sodium salt, N-(2-isonitroso-5,5-dimethylcyclohexan-1-one-3-ylidene)-D-alanine sodium salt, N-(2-isonitroso-5-isopropylcyclohexan-1-one-3-ylidene)-2-ethylglycine sodium salt, N-(2-isonitroso-5,5-dimethylcyclohexan-1-one-3-ylidene)-DL-valine sodium salt, N-(2-isonitroso-4,5-diphenylcyclohexan-1-one-3-ylidene-DL-valine sodium salt, N-(2-isonitroso-4-cyclohexylcyclohexan-1-one-3-ylidene)-DL-valine sodium salt, N-(2-isonitroso-5,5-dimethylcyclohexan-1-one-3-ylidene)-L-alanine sodium salt, N-(2-isonitroso-5,5-dimethylcyclohexan-1-one-3-ylidene)-DL-valine solium salt, N-(2-isonitroso-5,5-dimethylcyclohexan-1-one-3-ylidene)-D-valine sodium salt, N-(2-isonitroso-5,5-dimethylcyclohexan-1-one-3-ylidene)-L-valine sodium salt,
N-(2-isonitroso-4-amylcyclohexan-1-one-3-ylidene)-DL-norvaline sodium salt,
N-(2-isonitroso-5-cyclohexylcyclohexan-1-one-3-ylidene)-D-norvaline sodium salt,
N-(2-isonitroso-5,5-dimethylcyclohexan-1-one-3-ylidene)-L-leucine sodium salt,
N-(2-isonitroso-5,5-dimethylcyclohexan-1-one-3-ylidene)-D-leucine sodium salt,
N-(2-isonitroso-5,5-dimethylcyclohexan-1-one-3-ylidene)-DL-norleucine sodium salt,
N-(2-isonitroso-5,5-dimethylcyclohexan-1-one-3-ylidene)-DL-isoleucine sodium salt,
N-(2-isonitrosocyclohexan-1-one-3-ylidene) 2-cyclohexylglycine sodium salt,
N-(2-isonitroso-4-phenyl-cyclohexan-1-one-3-ylidene)-2-(p-chlorophenyl)glycine sodium salt,
N-(2-isonitroso-4-benzylcyclohexan-1-one-3-ylidene)-2-(p-nitrophenyl)glycine sodium salt,
N-(2-isonitroso-5,5-dimethylcyclohexan-1-one-3-ylidene)-DL-phenylalanine sodium salt,
N-(2-isonitroso-5-phenylcyclohexan-1-one-3-ylidene)-DL-phenylalanine sodium salt,
N-(2-isonitroso-5,5-dimethylcyclohexan-1-one-3-ylidene) L-phenylalanine sodium salt,
N-(2-isonitroso-5,5-dimethylcyclohexan-1-one-3-ylidene)-D-tyrosine sodium salt, and
N-(2-isonitrosocyclohexan-1-one-3-ylidene)-L-tyrosine sodium salt, respectively, were obtained.

EXAMPLE V

A suspension of 1 gram (0.0041 mol) of N-(5,5-dimethylcyclohex-2-en-1-one-3-yl) DL-valine in 5 ml. of water was cooled to 0° C., with stirring. Next, 0.283 gram (0.0041 mol) of sodium nitrite was added to the stirred suspension, and stirring was continued at 0° C. until a homogeneous dark purple solution was obtained. This solution was filtered and then acidified with an excess of acetic acid. On scratching the walls of the vessel containing the acidified solution, purple crystals appeared. These crystals were recovered by filtration, washed with a small amount of cold water and then air-dried, thus giving N - (2 - isonitroso - 5,5 - dimethylcyclohexan-1-one-3-ylidene) DL-valine.

EXAMPLE VI

A suspension of 50 mg. (0.174 mmol) of N-(5-phenylcyclohex-2-en-1-one-3-yl) DL-valine [prepared by condensing DL-valine benzyl ester hydrobromide with 5-phenylcyclohexane-1,3-dione in the manner described in Example I hereinabove, then subjecting the resulting N-(5-phenylcyclohex-2-en-1-one-3-yl) DL-valine benzyl ester to hydrogenolysis in the manner described in Example II hereinabove] and 33 mg. (0.174 mmol) of p-toluenesulfonic acid monohydrate in 3 ml. of cold water was cooled to 0° C., with stirring. Next, 17 mg. (0.25 mmol) of sodium nitrite were added to the stirred suspension, and stirring was continued at 0° C. for 2 hours. The purple N - (2 - isonitroso - 5 - phenylcyclohexan - 1 - one - 3 - ylidene) DL-valine which crystallized from the reaction mixture was collected by filtration, washed with water and dried.

EXAMPLE VII

A solution of 186 mg. (0.71 mmol) of N-(2-isonitroso-5,5 - dimethylcyclohexan - 1 - one - 3 - ylidene) - glycine sodium salt in 10 ml. of ethanol was admixed with 135 mg. (0.71 mmol) of p-toluenesulfonic acid monohydrate, and the resulting reaction mixture was refluxed for 30 minutes. Next, the ethanol was distilled off and the oily residue which remained was taken up in ethyl acetate and washed with an aqueous 10% sodium bicarbonate solution and then with water. The organic solution was then dried over anhydrous sodium sulfate and evaporated to dryness under reduced pressure. The resulting residue, dissolved in 2 ml. of chloroform, was chromatographed on 20 grams of neutral alumina to give, upon elution with chloroform, a yellow oil. This oil was then crystallized from diethyl ether/hexane, thus giving 5,5-dimethyl-7-oxo-4,5,6,7-tetrahydrobenzimidazole.

By repeating this procedure in every detail but one, namely, replacing N - (2 - isonitroso - 5,5 - dimethylcyclohexan - 1 - one - 3 - ylidene) glycine sodium salt with the remaining N - (2 - isonitrosocyclohex - 1 - one-3-ylidene) α-amino acid sodium salts prepared as described in Example IV hereinabove, the corresponding tautomeric 1,3-imidazoles, namely, 5,5-diethyl-7-oxo-4,5,6,7-tetrahydrobenzimidazole,
7-oxo-2,5,5-trimethyl-4,5,6,7-tetrahydrobenzimidazole [prepared from N-(2-isonotroso-5,5-dimethylcyclohexan-1-one-3-ylidene) DL-alanine, -D-alanine and -L-alanine sodium salts],
4,5-diphenyl-2-methyl-7-oxo-4,5,6,7-tetrahydrobenzimidazole,
2-ethyl-5-isopropyl-7-oxo-4,5,6,7-tetrahydrobenzimidazole,
5,5-dimethyl-2-isopropyl-7-oxo-4,5,6,7-tetrahydrobenzimidazole [prepared from N-(2-isonitroso-5,5-dimethylcyclohexan-1-one-3-ylidene) DL-valine, -D-valine and -L-valine sodium salts],
4,5-diphenyl-2-isopropyl-7-oxo-4,5,6,7-tetrahydrobenzimidazole,
4-cyclohexyl-2-isopropyl-7-oxo-4,5,6,7-tetrahydrobenzimidazole,
4-amyl-7-oxo-2-propyl-4,5,6,7-tetrahydrobenzimidazole,
5-cyclohexyl-7-oxo-2-propyl-4,5,6,7-tetrahydrobenzimidazole,
5,5-dimethyl-2-(2'-methylpropyl)-7-oxo-4,5,6,7-tetrahydrobenzimidazole [prepared from N-(2-isonitroso-5,5-dimethylcyclohexan-1-one-3-ylidene) D-leucine and -L-leucine sodium salts],
2-butyl-5,5-dimethyl-7-oxo-4,5,6,7-tetrahydrobenzimidazole,
5,5-dimethyl-2-(1'-methylpropyl)-7-oxo-4,5,6,7-tetrahydrobenzimidazole,
2-cyclohexyl-7-oxo-4,5,6,7-tetrahydrobenzimidazole,
2-(p-chlorophenyl)-4-phenyl-7-oxo-4,5,6,7-tetrahydrobenzimidazole,
4-benzyl-2-(p-nitrophenyl)-7-oxo-4,5,6,7-tetrahydrobenzimidazole,
2-benzyl-5,5-dimethyl-7-oxo-4,5,6,7-tetrahydrobenzimidazole [prepared from N-(2-isonitroso-5,5-dimethylcyclohexan-1-one-3-ylidene) DL-phenylalanine and -L-phenylalanine sodium salts],
2-methyl-7-oxo-4,5,6,7-tetrahydrobenzimidazole,
2-benzyl-7-oxo-5-phenyl-4,5,6,7-tetrahydrobenzimidazole,
2-benzyl-7-oxo-4-propyl-4,5,6,7-tetrahydrobenzimidazole,
5,5-dimethyl-2-(p-hydroxybenzyl)-7-oxo-4,5,6,7-tetrahydrobenzimidazole,
2-(p-hydroxybenzyl)-7-oxo-4,5,6,7-tetrahydrobenzimidazole
2-carboxymethyl-5,5-dimethyl-7-oxo-4,5,6,7-tetrahydrobenzimidazole,
4-benzyl-2-carboxymethyl-7-oxo-4,5,6,7-tetrahydrobenzimidazole,
2-carboxymethyl-5,5-diethyl-7-oxo-4,5,6,7-tetrahydrobenzimidazole, and
2-(2'-carboxyethyl)-5-propyl-7-oxo-4,5,6,7-tetrahydrobenzimidazole, respectively, were obtained.

EXAMPLE VIII

A suspension of 0.9 gram of N-(2-isonitroso-5,5-dimethylcyclohexan-1-one-3-ylidene) DL-valine in 20 ml.

of benzene was refluxed for 1 hour, at which point a homogeneous solution was obtained. This solution was then evaporated to dryness under reduced pressure, and the resulting residue was taken up in chloroform and chromatographed on 50 grams of neutral alumina. The product eluted with chloroform was crystallized from ethyl acetate, thus giving 5,5-dimethyl-2-isopropyl-7-oxo-4,5,6,7-tetrahydrobenzimidazole, identical to the compounds prepared from N-(2-isonitroso-5,5-dimethylcyclohexan-1-one-3-ylidene) DL-valine, -D-valine and -L-valine sodium salts in the manner described in Example VII hereinabove.

EXAMPLE IX

The N-(2 - isonitroso - 5-phenylcyclohexan-1-one-3-ylidene) DL-valine prepared as described in Example VI hereinabove was dissolved in 20 ml. of absolute ethanol and then refluxed for 15 minutes, at which point the solution was yellow in color. The ethanol was then evaporated off under reduced pressure and the resulting residue was dissolved in chloroform and chromatographed on silica. Elution with chloroform/5% methanol gave colorless crystals of 2 - isopropyl-7-oxo-5-phenyl-4,5,6,7-tetrahydrobenzimidazole.

EXAMPLE X 0.1 mol of N,N'-dicyclohexylcarbodiimide was added to a mixture of 0.1 mol of N-(5,5-dimethyl-cyclohex-2-en-1-one-3-yl) glycine, 0.1 mol of DL-valine benzyl ester hydrobromide and 100 cc. of pyridine, and the resulting reaction mixture was allowed to stand at room temperature overnight. Following this reaction period the reaction mixture was filtered and the resulting filtrate was cooled to 0° C., adjusted to pH 6 by the addition of aqueous hydrochloric acid, and then extracted with chloroform. The thus-obtained extract was washed with water, then with an aqueous 3% sodium bicarbonate solution and again with water, then dried over anhydrous sodium sulfate, concentrated to a small volume under reduced pressure and diluted with petroleum ether. The resulting precipitate was collected by filtration and recrystallized from ethanol, thus giving N-(5,5-dimethylcyclohex-2-en-1-one-3-yl) glycyl DL-valine benzyl ester.

By repeating this procedure in every detail but one, namely, replacing DL-valine benzyl ester hydrobromide with DL-β-phenylalanine benzyl ester hydrobromide, N-(5,5 - dimethylcyclohex - 2-en-1-one-3-yl) glycyl-DL-β-phenylalanine benzyl ester was obtained.

EXAMPLE XI

By treating N-(5,5 - dimethylcyclohex-2-en-1-one-3-yl) glycyl glycine benzyl ester and N-(5,5-dimethylcyclohex-2-en-1-one) glycyl-DL-alanine benzyl ester [Halpern et al., Nature, 202, No. 4932 (May 9, 1964), pp. 592 and 593], respectively, with hydrogen in methanol in the presence of pre-hydrogenated 5% palladium-on-charcoal hydrogenation catalyst in the manner described in Example II hereinabove, the corresponding free N-(5,5-dimethylcyclohex - 2-en-1-one-3-yl) peptide derivatives were obtained. These free peptide derivatives, together with the esterified peptide esters prepared as described in Example X hereinabove, were then reacted with sodium nitrite in water in the manner described in Example IV hereinabove, thus giving N-(2 - isonitroso-5,5-dimethylcyclohexan-1-one-3-ylidene) glycyl glycine sodium salt, N-(2-isonitroso - 5,5 - dimethylcyclohexan-1-one-3-ylidene) glycyl DL-alanine sodium salt, N-(2 - isonitroso-5,5-dimethylcyclohexan-1-one-3-ylidene) glycyl DL-valine benzyl ester and N-(2 - isonitroso-5,5-dimethylcyclohexan-1-one-3-ylidene) glycyl DL-β-phenylalanine benzyl ester, respectively.

Finally, the thus-obtained isonitroso sodium salt derivatives and the isonitroso benzyl ester derivatives were treated in the manner described in Examples VII and VIII hereinabove, respectively, giving 2-[N-(carboxymethyl) amido] - 5,5-dimethyl-7-oxo-4,5,6,7-tetrahydrobenzimidazole which can be represented by the structural formula

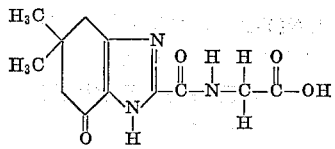

2 - {N-[(1'-carboxy)ethyl]amido}-5,5-dimethyl-7-oxo-4,5,6,7-tetrahydrobenzimidazole which can be represented by the structural formula

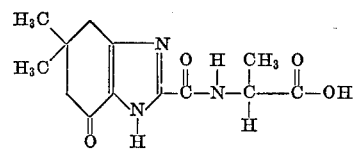

2 - {N-[(1'-carbobenzoxy-2'-methyl)propyl]amido}-5,5-dimethyl - 7 - oxo-4,5,6,7-tetrahydrobenzimidazole which can be represented by the structural formula

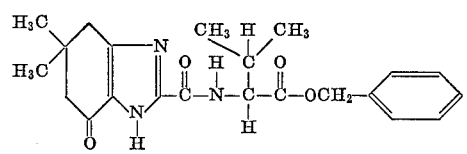

and 2-{N-[(1'-carbobenzoxy)-β-phenylethyl]amido}-5,5-dimethyl - 7 - oxo-4,5,6,7-tetrahydrobenzimidazole which can be represented by the structural formula

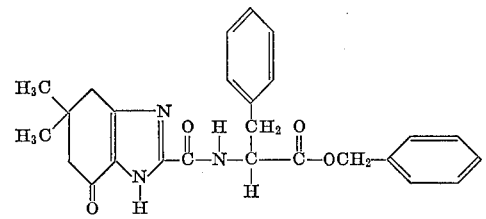

What is claimed is:
1. A compound of the formula:

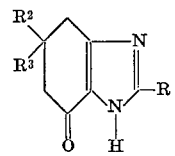

wherein R is selected from the group consisting of lower alkyl of less than eight carbon atoms, benzyl, and phenyl; R² is selected from the group consisting of hydrogen and lower alkyl of less than eight carbon atoms; and R³ is selected from the group consisting of hydrogen, lower alkyl of less than eight carbon atoms, and phenyl; provided that when R³ is phenyl, then R² is hydrogen.

2. A compound according to claim 1 wherein R², R³ and R are each lower alkyl.

3. A compound according to claim 1 wherein R² and R³ are each methyl and R is isopropyl.

4. A compound according to claim 1 wherein R² and R³ are each methyl and R is benzyl.

5. A compound according to claim 1 wherein R² and R³ are each hydrogen and R is isopropyl.

6. A compound according to claim 1 wherein R² and R³ are each lower alkyl and R is isopropyl.

7. A compound according to claim 1 wherein R³ is phenyl and R is isopropyl.

8. A compound according to claim 1 wherein $R^2$ is hydrogen, $R^3$ is lower alkyl and R is isopropyl.

References Cited

UNITED STATES PATENTS 3,303,199  2/1967  Doebel et al. _____ 260—309

OTHER REFERENCES

Halpern et al.: (Halpern, Cross and Deer) Chem. Ind. 1966, p. 731 (Apr. 30, 1966), TPI. S63.

Vanags et al.: Chem. Abst. vol. 61, column 16062 (1964), QDI. A51.

NATALIE TROUSOF, Primary Examiner

U.S. Cl. X.R.

260—256.4, 294.3, 294.7, 295, 296, 326.3, 332.2, 345.7, 345.8, 347.3, 347.4, 468, 471, 482, 514, 518, 586, 590, 999